H. L. HOPKINS.
CUTTING APPARATUS FOR MOWING AND REAPING MACHINES AND GRAIN HARVESTERS.
APPLICATION FILED NOV. 6, 1914.
1,158,501. Patented Nov. 2, 1915.
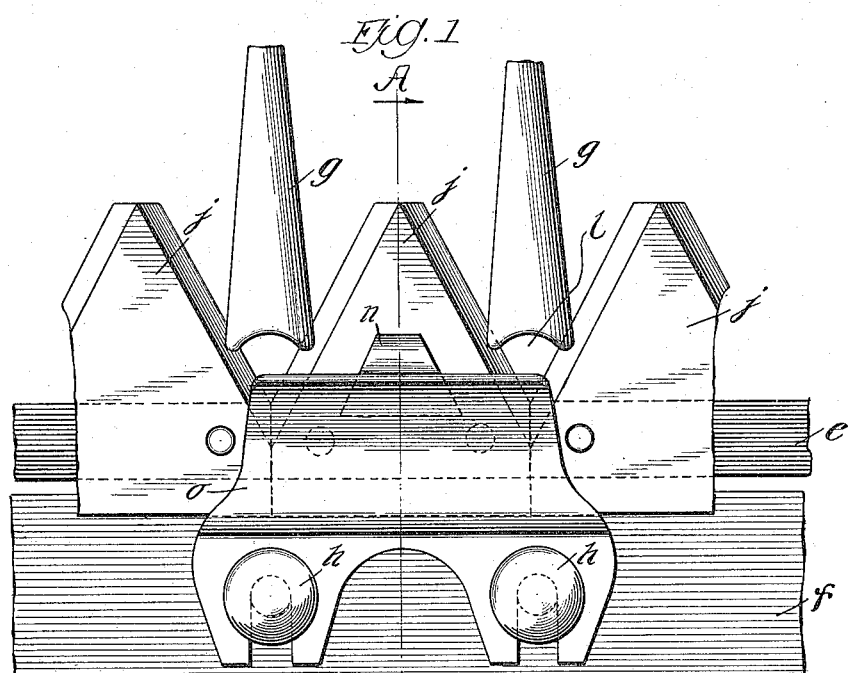
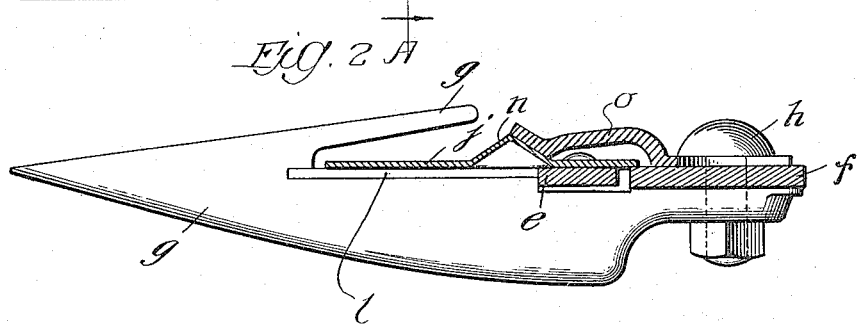
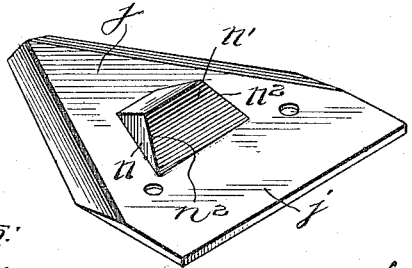

UNITED STATES PATENT OFFICE.

HARVEY L. HOPKINS, OF CHICAGO, ILLINOIS, ASSIGNOR OF ONE-HALF TO JOHN HOWARD McELROY, OF CHICAGO, ILLINOIS, AND ONE-HALF TO SAID McELROY, TRUSTEE.

CUTTING APPARATUS FOR MOWING AND REAPING MACHINES AND GRAIN-HARVESTERS.

1,158,501.      Specification of Letters Patent.      Patented Nov. 2, 1915.

Application filed November 6, 1914. Serial No. 870,544.

*To all whom it may concern:*

Be it known that I, HARVEY L. HOPKINS, a citizen of the United States, and a resident of Chicago, in the county of Cook and State of Illinois, have invented certain new and useful Improvements in Cutting Apparatus for Mowing and Reaping Machines and Grain-Harvesters, of which the following is a full, clear, and exact specification.

My invention is concerned with cutting apparatus for mowing and reaping machines and grain harvesters, and is designed to produce a sickle construction which in efficiency shall be very much superior to any now in use.

As is well known to those skilled in the art, the grass being cut tends to get between the knife sections and the ledger plates, thereby raising the sections from the plates and preventing a shear cut, and various constructions have been devised to overcome this difficulty, such, for instance, as those employing springs to hold the knife sections down on the ledger plates. It is also well known that the resistance of the grass to the shearing action tends to thrust the cutter bar and the attached knife sections backward, and my invention consists of a simple and inexpensive construction in which this backward thrust is utilized to hold the knife sections down on the ledger plates and prevent their separation, thus insuring a shear cut and a clean knife under all conditions.

While the problem seems simple, yet it is complicated by the fact that the moving parts tend to "gum" up, owing to the sticky juice or sap of some of the grasses or weeds cut in using the apparatus, and then, too, dirt and other foreign matters besides the grass assist in the clogging action, and the apparatus must be such as to operate in spite of this gumming or clogging tendency. None of the devices heretofore proposed to carry out the objects and purposes of my invention are constructed so that they will operate because they do not take care of this tendency, and none of them are in use to-day, despite the crying need therefor. By my novel construction I secure the desired pressure of the knife sections on the ledger plates, and the same backward thrust on the cutter bar which I utilize to produce the aforesaid pressure also serves to produce a pressure and scraping action between the bearing surfaces which I employ in my invention, which scraping action keeps the aforesaid bearing surfaces absolutely clean, which surfaces otherwise would tend to gum up.

To illustrate my invention, I annex hereto a sheet of drawings, in which the same reference characters are used to designate identical parts in all the figures, of which,—

Figure 1 is a top plan view of a portion of the inner end of the cutting apparatus of an ordinary mowing machine; Fig. 2 is a section on the line A—A of Fig. 1; Fig. 3 is a perspective view of one of the knife sections detached; and Fig. 4 is a central section through a portion of said knife section, on an enlarged scale.

In carrying out my invention, I employ the customary cutter bar $e$, with the customary knife sections $j$ riveted thereto, the cutter bar being adapted to reciprocate adjacent to the customary finger bar $f$, to the under side of which the guard fingers $g$ are secured by the bolts $h$ in the customary manner; and it will of course be understood that the knife sections or blades $j$ coöperate with the ledger plates $l$ secured in the guard fingers $g$ in the customary manner.

To hold the knife sections $j$ down upon the ledger plates $l$, and thus secure the desired shearing cut under all conditions, I employ the following novel mechanism: Upon certain of the knife sections, say one to every foot, I form the lugs $n$, which are preferably stamped up from the body of the knife sections during the process of manufacture and have the shape shown, and these lugs are located centrally of the sections, but toward the rear of the cutting edges thereof, and the rear inclined side $n'$ of the lug constitutes a bearing surface, which must be inclined at substantially the angle shown, which may vary a few degrees from thirty degrees, and which is adapted to coöperate with the correspondingly inclined under surfaces of the overhanging knife clips $o$, which are preferably provided with slotted portions through which the bolts $h$ pass to secure them adjustably in place.

The lug $n$ is much shorter than the coöperating clip $o$, and the contacting surfaces of said lug and clip bear such relationship to each other and to the length of the reciprocation of the cutter bar and its attached knife sections that every portion of the contacting surface of the clip $o$ is exposed at some time during the reciprocation, and is scraped clean by one or the other of the square ends $n^2$ of the bearing surface $n'$ of the lug, the backward thrust on the knife sections and the inclination of the engaging surfaces serving to force the latter together and insuring that the engaging surface of the clip shall be scraped absolutely clean at each reciprocation, thus preventing any possibility whatever of any clogging resulting from the employment of my novel construction in connection with the ordinary cutting apparatus. At the same time, the same backward thrust on the knife sections, due to the resistance of the grass and the coöperation of the inclined contacting surfaces of the lug $n$ and the clip $o$, will force the knife sections $j$ downward upon the ledger plates $l$, and the greater the rearward thrust the harder they will be pressed down, so that the more difficult the cutting the more certain the action of the desired shear cut.

While I have shown and described my invention as embodied in the form which I at present consider best adapted to carry out its purposes, it will be understood that it is capable of some modifications, and that accordingly I do not desire to be limited in the interpretation of the following claims except as may be necessitated by the state of the prior art.

What I claim as new, and desire to secure by Letters Patent of the United States, is:

1. In a device of the class described, the combination with a finger bar and guard fingers carried thereby, of a cutter bar and knife sections secured thereto adapted to reciprocate on the finger bar, some of said knife sections having lugs projecting from the upper surface thereof and formed integral therewith, each lug having a bearing surface inclined relatively to the plane of the knife sections at substantially the angle shown, thirty degrees, and retaining clips carried by the finger bar corresponding in number to the lugs, each retaining clip having a correspondingly inclined bearing surface coöperating with the bearing surface of its associated lug, for the purpose described.

2. In a device of the class described, the combination with a finger bar and guard fingers carried thereby, of a cutter bar and knife sections secured thereto adapted to reciprocate on the finger bar, some of said knife sections having lugs projecting from the center of the upper surface thereof and formed integral therewith, each lug having a bearing surface inclined relatively to the plane of the knife sections at substantially the angle shown, thirty degrees, and having the ends of said bearing surfaces substantially parallel to the cutting edges of the sections, and retaining clips carried by the finger bar corresponding in number to the lugs, each retaining clip having a correspondingly inclined bearing surface coöperating with the bearing surface of its associated lug, for the purpose described.

In witness whereof, I have hereunto set my hand and affixed my seal, this 15th day of October, A. D. 1914.

HARVEY L. HOPKINS. [L. S.]

Witnesses:
 JOHN HOWARD MCELROY,
 MILDRED ELSNER.

Copies of this patent may be obtained for five cents each, by addressing the "Commissioner of Patents, Washington, D. C."